US009622236B2

(12) United States Patent
Xu et al.

(10) Patent No.: US 9,622,236 B2
(45) Date of Patent: Apr. 11, 2017

(54) METHOD FOR TRANSMITTING AND RECEIVING DOWNLINK SIGNAL, NETWORK SYSTEM, AND TERMINAL

(71) Applicant: Huawei Technologies Co., Ltd., Shenzhen (CN)

(72) Inventors: Xiuqiang Xu, Shenzhen (CN); Shunqing Zhang, Shenzhen (CN); Yan Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 14/616,252

(22) Filed: Feb. 6, 2015

(65) Prior Publication Data

US 2015/0156754 A1    Jun. 4, 2015

Related U.S. Application Data

(63) Continuation of application No. PCT/CN2013/076146, filed on May 23, 2013.

(30) Foreign Application Priority Data

Aug. 6, 2012   (CN) .......................... 2012 1 0277206

(51) Int. Cl.
*H04W 28/16*    (2009.01)
*H04W 48/10*    (2009.01)
(Continued)

(52) U.S. Cl.
CPC ......... *H04W 72/042* (2013.01); *H04W 48/10* (2013.01); *H04W 4/023* (2013.01);
(Continued)

(58) Field of Classification Search
CPC ..... H04W 4/023; H04W 24/00; H04W 48/10; H04W 48/12; H04W 72/042; H04W 28/16; Y02B 60/50
(Continued)

(56) References Cited

U.S. PATENT DOCUMENTS 8,885,582 B2 * 11/2014 Yamada .............. H04W 72/042
                                                               370/329
2005/0186916 A1    8/2005 Moon et al.
(Continued)

FOREIGN PATENT DOCUMENTS

CN    1649282 A    8/2005
CN    1922902 A    2/2007
(Continued)

OTHER PUBLICATIONS

Xu et al., "On Functionality Separation for Green Mobile Networks: Concept Study Over LTE," IEEE Communications Magazine, pp. 82-90, vol. 51, Issue 5, Institute of Electrical and Electronics Engineers, New York, New York (May 2013).
(Continued)

*Primary Examiner* — Tri H Phan
(74) *Attorney, Agent, or Firm* — Leydig, Voit & Mayer, Ltd.

(57) ABSTRACT

The present invention provides a method for transmitting a downlink signal, a method for receiving a downlink signal, a network system and a terminal. The method includes: transmitting, by a control base station, a first group of downlink signal to a terminal; and transmitting, by a data base station, a second group of downlink signal to the terminal, the first group of downlink signal is at least partially different from the second group of downlink signal. The first group of downlink signal and the second group of downlink signal enable the terminal to implement a network
(Continued)

- - - → synchronization signal, pilot signal, bottom layer control signal, unicast data signal ⎯⎯⎯→ synchronization signal, broadcast signal, paging signal, pilot signal, bottom layer control signal high layer control signal, multicast data signal function according to the first group of downlink signal and/or the second group of downlink signal. Embodiments of the present invention can improve network energy efficiency.

12 Claims, 9 Drawing Sheets

(51) Int. Cl.
| | |
|---|---|
| *H04W 48/12* | (2009.01) |
| *H04W 72/04* | (2009.01) |
| *H04W 24/00* | (2009.01) |
| *H04W 4/02* | (2009.01) |

(52) U.S. Cl.
CPC ............ *H04W 24/00* (2013.01); *H04W 48/12* (2013.01); *Y02B 60/50* (2013.01)

(58) Field of Classification Search
USPC .................................................. 370/310–350
See application file for complete search history.

(56) References Cited

U.S. PATENT DOCUMENTS

| | | | |
|---|---|---|---|
| 2008/0242224 A1 | 10/2008 | Fratti et al. | |
| 2008/0318589 A1 | 12/2008 | Liu et al. | |
| 2009/0144442 A1 | 6/2009 | Zheng et al. | |
| 2010/0061472 A1* | 3/2010 | Molnar | H04B 7/0417 375/260 |
| 2010/0158256 A1* | 6/2010 | Sawahashi | H04J 13/16 380/287 |
| 2010/0165873 A1* | 7/2010 | Higuchi | H04W 48/12 370/254 |
| 2010/0232355 A1 | 9/2010 | Richeson et al. | |
| 2010/0329206 A1 | 12/2010 | Thome et al. | |
| 2011/0194516 A1* | 8/2011 | Aiba | H04L 1/0026 370/329 |
| 2012/0190375 A1 | 7/2012 | Gu et al. | |
| 2013/0165130 A1 | 6/2013 | Wu et al. | |
| 2015/0049741 A1* | 2/2015 | Chen | H04W 48/12 370/336 |
| 2015/0085717 A1* | 3/2015 | Papasakellariou | H04L 5/14 370/280 |
| 2015/0230211 A1* | 8/2015 | You | H04L 5/0051 370/330 |
| 2015/0245323 A1* | 8/2015 | You | H04W 72/042 370/329 |
| 2015/0249972 A1* | 9/2015 | You | H04L 5/001 370/254 |
| 2015/0257173 A1* | 9/2015 | You | H04L 1/1864 370/330 |

FOREIGN PATENT DOCUMENTS

| | | |
|---|---|---|
| CN | 101123549 A | 2/2008 |
| CN | 101500246 A | 8/2009 |
| CN | 102300340 A | 12/2011 |
| CN | 102348244 A | 2/2012 |
| CN | 103533589 A | 1/2014 |
| CN | 103582024 A | 2/2014 |
| CN | 104113875 A | 10/2014 |
| CN | 104244426 A | 12/2014 |
| EP | 1372349 A1 | 12/2003 |
| WO | WO 2011100676 A1 | 8/2011 |

OTHER PUBLICATIONS

"3rd Generation Partnership Project; Technical Specification Group Radio Access Network; Study on Small Cell Enhancements for E-UTRA and E-UTRAN; Higher Layer Aspects (Release 12)," 3GPP TR 36.842, V12.0.0, pp. 1-71, 3rd Generation Partnership Project, Valbonne, France (Dec. 2013).

* cited by examiner

- - - → synchronization signal, pilot signal, bottom layer control signal, unicast data signal ⎯⎯⎯→ synchronization signal, broadcast signal, paging signal, pilot signal, bottom layer control signal high layer control signal, multicast data signal

METHOD FOR TRANSMITTING AND RECEIVING DOWNLINK SIGNAL, NETWORK SYSTEM, AND TERMINAL

CROSS REFERENCE TO RELATED APPLICATIONS

This application is a continuation of International Patent Application No. PCT/CN2013/076146, filed on May 23, 2013, which claims priority to Chinese Patent Application No. 201210277206.X, filed on Aug. 6, 2012, both of which are hereby incorporated by reference in their entireties.

TECHNICAL FIELD

Embodiments of the present invention relate to wireless communication technologies and, in particular, to a method for transmitting a downlink signal, a method for receiving a downlink signal, a network system and a terminal.

BACKGROUND

In a wireless cellular network, a terminal usually has the following three states: detached state, idle state, and active state. In order to satisfy requirements of normal operation of terminals in different states, the network provides at least one of the following network functions: a synchronization function, a broadcast function, a paging function, a unicast function, and a multicast function. To achieve the above network functions, the network side needs to issue the following downlink signals correspondingly: a synchronization signal, a broadcast signal, a paging signal, a unicast data signal, a multicast data signal, a bottom layer control signal, a high layer dedicated control signal and a pilot signal. The corresponding relationships between the network functions and the downlink signals are as follows: the synchronization function corresponds to the synchronization signal; the broadcast function corresponds to the broadcast signal, the bottom layer control signal and the pilot signal; the paging function corresponds to the bottom layer control signal, the pilot signal and the paging signal; the unicast function corresponds to the bottom layer control signal, the pilot signal, the unicast data signal and the high layer dedicated control signal; the multicast function corresponds to the bottom layer control signal, the pilot signal and the multicast data signal.

In the prior art, for a terminal, these various signals are transmitted by a same base station. It results in reduction of the network energy efficiency, for example, the high cost of control signaling, the network configuration which is not flexible enough and the space which is lack of optimal design and etc are caused.

SUMMARY

For this purpose, embodiments of the present invention provide a method for transmitting a downlink signal, a method for receiving a downlink signal, a network system and a terminal, so as to solve the problem of low network energy efficiency in the prior art.

In one aspect, the present invention provides a method for transmitting a downlink signal, including:
transmitting, by a control base station, a first group of downlink signal to a terminal;
transmitting, by a data base station, a second group of downlink signal to the terminal;
the first group of downlink signal is at least partially different from the second group of downlink signal;
the first group of downlink signal and the second group of downlink signal enable the terminal to implement a network function according to the first group of downlink signal and/or the second group of downlink signal.

In a possible implementation, the first group of downlink signals includes: a broadcast signal, a paging signal, a multicast data signal, a high layer dedicated control signal, a bottom layer control signal and a pilot signal; or, a synchronization signal, a broadcast signal, a paging signal, a unicast data signal, a multicast data signal, a high layer dedicated control signal, a bottom layer control signal and a pilot signal;

the second group of downlink signals includes: a synchronization signal, a unicast data signal and a pilot signal; or, a synchronization signal, a unicast data signal, a pilot signal and at least one of the following: a multicast data signal, a high layer dedicated control signal and a bottom layer control signal.

In another possible implementation, the transmitting, by the control base station, the first group of downlink signal to the terminal, includes:
transmitting, by the control base station, a synchronization signal to the terminal, so that the terminal implements a synchronization function with the control base station; or,
transmitting, by the control base station, a pilot signal, a bottom layer control signal and a broadcast signal to the terminal, so that the terminal implements a broadcast function after the terminal is synchronized to the control base station; or,
transmitting, by the control base station, a pilot signal, a bottom layer control signal and a public multicast data signal bearing multimedia information to the terminal, so that the terminal implements a multicast function after the terminal is synchronized to the control base station; or,
transmitting, by the control base station, a pilot signal, a bottom layer control signal and a paging signal to the terminal, so that the terminal implements a paging function after the terminal is synchronized to the control base station.

In another possible implementation, where the transmitting, by the control base station, the first group of downlink signal to the terminal, and the transmitting, by the data base station, the second group of downlink signal to the terminal, includes:
transmitting, by the control base station, a pilot signal, a bottom layer control signal and a dedicated multicast data signal bearing a high layer dedicated control signal to the terminal; transmitting, by the data base station, a synchronization signal, a pilot signal, a bottom layer control signal and a unicast data signal bearing unicast data information to the terminal, so that the terminal synchronizes to the data base station and implements the unicast function; or
transmitting, by the control base station, a high layer dedicated control signal to the data base station; transmitting, by the data base station, a synchronization signal, a pilot signal, a bottom layer control signal and a unicast data signal bearing a high layer dedicated control signal and unicast data information to the terminal, so that the terminal synchronizes to the data base station and implements the unicast function.

In another possible implementation, the method further includes:
judging, by a judging node, whether to assign the data base station for the terminal, if yes, then determining the data base station, so that data information from a core network are transmitted to the terminal via the data base station.

In another possible implementation, the judging whether to assign the data base station for the terminal, includes:

when at least one of following items is satisfied, judging that assigning the data base station for the terminal is not needed, otherwise judging that assigning the data base station is needed:

a service currently used by the terminal belongs to a preset service for which assigning the data base station is not needed;

a moving speed of the terminal is higher than a preset value, or the terminal is identified as a high speed terminal;

a distance between the terminal and a nearest base station exceeds a preset threshold value;

a signal quality of a signal received by the terminal from the data base station, of which the signal quality is the best, is lower than a preset threshold value, or, a signal intensity of a signal received by the terminal from the data base station, of which the signal intensity is the best, is lower than a preset threshold value.

In another possible implementation, the determining the data base station, includes:

determining that the data base station is a base station which is nearest to the terminal; or determining that the data base station is a base station from which a signal quality of a signal received by the terminal is the best, or is a base station from which a signal intensity of a signal received by the terminal is the best.

In another possible implementation, the method further includes:

when the judging node judges that assigning the data base station to the terminal is needed, transmitting, by a selecting node, the data information from the core network to the data base station, so that the data base station transmits the data information to the terminal; or when the judging node judges that assigning the data base station to the terminal is not needed, transmitting, by the selecting node, the data information from the core network to the control base station, so that the control base station transmits the data information to the terminal.

In another inspect, the present invention provides a method for receiving a downlink signal, including:

receiving, by a terminal, a first group of downlink signal from a control base station, and a second group of downlink signal from a data base station, where the first group of downlink signal is at least partially different from the second group of downlink signal;

implementing, by the terminal, a network function according to the first group of downlink signal and/or the second group of downlink signal.

In a possible implementation, the first group of downlink signals includes: a synchronization signal, a broadcast signal, a paging signal, a multicast data signal, a high layer dedicated control signal, a bottom layer control signal and a pilot signal; or, a synchronization signal, a broadcast signal, a paging signal, a unicast data signal, a multicast data signal, a high layer dedicated control signal, a bottom layer control signal and a pilot signal;

the second group of downlink signals includes: a synchronization signal, a unicast data signal and a pilot signal; or, a synchronization signal, a unicast data signal, a pilot signal and at least one of the following: a multicast data signal, a high layer dedicated control signal and a bottom layer control signal.

In another possible implementation, the implementing, by the terminal, the network function according to the first group of downlink signal and/or the second group of downlink signal, includes:

implementing, by the terminal, a synchronization function with the control base station according to a synchronization signal transmitted by the control base station; or, implementing, by the terminal, a broadcast function after the terminal is synchronized to the control base station, according to a pilot signal, a bottom layer control signal and a broadcast signal which are transmitted by the control base station; or, implementing, by the terminal, a multicast function after the terminal is synchronized to the control base station, according to a pilot signal, a bottom layer control signal and a public multicast data signal bearing multimedia information which are transmitted by the control base station; or, implementing, by the terminal, a paging function after the terminal is synchronized to the control base station, according to a pilot signal, a bottom layer control signal and a paging signal which are transmitted by the control base station.

In another possible implementation, the implementing, by the terminal, the network function according to the first group of downlink signal and/or the second group of downlink signal, includes:

synchronizing, by the terminal, to the data base station, and then implementing a unicast function, according to a pilot signal, a bottom layer control signal and a dedicated multicast data signal bearing a high layer dedicated control signal which are transmitted by the control base station, and a synchronization signal, a pilot signal, a bottom layer control signal and a unicast data signal bearing unicast data information which are transmitted by the data base station; or synchronizing, by the terminal, to the data base station, and then implementing a unicast function, according to a synchronization signal, a pilot signal, a bottom layer control signal and a unicast data signal bearing a high layer dedicated control signal and unicast data information which are transmitted by the data base station, where the high layer dedicated control signal is transmitted to the data base station by the control base station.

In another aspect, the present invention provides a network system, including:

a control base station, configured to transmit a first group of downlink signal to a terminal;

a data base station, configured to transmit a second group of downlink signal to the terminal;

the first group of downlink signal is at least partially different from the second group of downlink signal;

the first group of downlink signal and the second group of downlink signals enable the terminal to implement a network function according to the first group of downlink signals and/or the second group of downlink signal.

In a possible implementation, the first group of downlink signals transmitted by the control base station includes: a synchronization signal, a broadcast signal, a paging signal, a multicast data signal, a high layer dedicated control signal, a bottom layer control signal and a pilot signal; or, a synchronization signal, a broadcast signal, a paging signal, a unicast data signal, a multicast data signal, a high layer dedicated control signal, a bottom layer control signal and a pilot signal;

the second group of downlink signals transmitted by the data base station includes: a synchronization signal, a unicast data signal and a pilot signal; or, a synchronization signal, a unicast data signal, a pilot signal and at least one of the following: a multicast data signal, a high layer dedicated control signal and a bottom layer control signal.

In another possible implementation, the control base station is specifically configured to:

transmit a synchronization signal to the terminal, so that the terminal implements a synchronization function with the control base station; or transmit a pilot signal, a bottom layer control signal and a broadcast signal to the terminal, so that the terminal implements a broadcast function after the terminal is synchronized to the control base station; or transmit a pilot signal, a bottom layer control signal and a common multicast data signal bearing multimedia information to the terminal, so that the terminal implements a multicast function after the terminal is synchronized to the control base station; or transmit a pilot signal, a bottom layer control signal and a paging signal to the terminal, so that the terminal implements a paging function after the terminal is synchronized to the control base station.

In another possible implementation, the control base station is specifically configured to transmit a pilot signal, a bottom layer control signal and a dedicated multicast data signal bearing a high layer dedicated control signal to the terminal; and the data base station is configured to transmit a synchronization signal, a pilot signal, a bottom layer control signal and a unicast data signal bearing unicast data information to the terminal, so that the terminal synchronizes to the data base station and implements a unicast function; or the control base station is specifically configured to transmit a high layer dedicated control signal to the data base station; and the data base station is specifically configured to transmit a synchronization signal, a pilot signal, a bottom layer control signal and a unicast data signal bearing the high layer dedicated control signal and unicast data information to the terminal, so that the terminal synchronizes to the data base station and implements a unicast function.

In another possible implementation, the network system further includes:

a judging node, configured to judge whether to assign the data base station for the terminal, if yes, then determine the data base station, so that data information from a core network is transmitted to the terminal via the data base station.

In another possible implementation,
the judging node is specifically configured to:
when at least one of the following items is satisfied, judge that assigning the data base station for the terminal is not needed, otherwise judge that assigning the data base station is needed:

a service currently used by the terminal belongs to a preset service for which assigning the data base station is not needed;

a moving speed of the terminal is higher than a preset value, or the terminal is identified as a high speed terminal;

a distance between the terminal and a nearest base station exceeds a preset threshold value;

a signal quality of a signal received by the terminal from the data base station, of which the signal quality is the best, is lower than a preset threshold value, or, a signal intensity of a signal received by the terminal from the data base station, of which the signal intensity is the best, is lower than a preset threshold value.

In another possible implementation, the judging node is specifically configured to: determine that the data base station is a base station which is nearest to the terminal; or determine that the data base station is a base station from which a signal quality of a signal received by the terminal is the best, or is a base station from which a signal intensity of a signal received by the terminal is the best.

In another possible implementation, the network system further includes:

a selecting node, configured to, when the judging node judges that assigning the data base station to the terminal is needed, transmit the data information from the core network to the data base station, so that the data base station transmits the data information to the terminal; or, when the judging node judges that assigning the data base station to the terminal is not needed, transmit the data information from the core network to the control base station, so that the control base station transmits the data information to the terminal.

In another aspect, the present invention provides a terminal, including:

a receiver, configured to receive a first group of downlink signal from a control base station, and a second group of downlink signal from a data base station, where the first group of downlink signal is at least partially different from the second group of downlink signal;

a processor, configured to implement a network function according to the first group of downlink signal and/or the second group of downlink signal.

In a possible implementation, the first group of downlink signals received by the receiver includes: a synchronization signal, a broadcast signal, a paging signal, a multicast data signal, a high layer dedicated control signal, a bottom layer control signal and a pilot signal; or, a synchronization signal, a broadcast signal, a paging signal, a unicast data signal, a multicast data signal, a high layer dedicated control signal, a bottom layer control signal and a pilot signal;

the second group of downlink signals received by the receiver includes: a synchronization signal, a unicast data signal and a pilot signal; or, a synchronization signal, a unicast data signal, a pilot signal and at least one of the following: a multicast data signal, a high layer dedicated control signal and a bottom layer control signal.

In another possible implementation, the processor is specifically configured to:

implement a synchronization function with the control base station according to a synchronization signal transmitted by the control base station; or, implement a broadcast function after the terminal is synchronized to the control base station, according to a pilot signal, a bottom layer control signal and a broadcast signal which are transmitted by the control base station; or, implement a multicast function after the terminal is synchronized to the control base station, according to a pilot signal, a bottom layer control signal and a public multicast data signal bearing multimedia information which are transmitted by the control base station; or, implement a paging function after the terminal is synchronized to the control base station, according to a pilot signal, a bottom layer control signal and a paging signal which are transmitted by the control base station.

In another possible implementation, the processor is specifically configured to:

synchronize to the data base station, and then implement a unicast function, according to a pilot signal, a bottom layer control signal and a dedicated multicast data signal bearing a high layer dedicated control signal which are transmitted by the control base station, and a synchronization signal, a pilot signal, a bottom layer control signal and a unicast data signal bearing unicast data information which are transmitted by the data base station; or synchronize to the data base station, and then implement a unicast function, according to a synchronization signal, a pilot signal, a bottom layer control signal and a unicast data signal bearing a high layer dedicated control signal and unicast data information which are transmitted by the data base station, where the high layer dedicated control signal is transmitted to the data base station by the control base station.

According to the above technical solutions, different base stations transmits downlink signals to the same terminal, respectively, thereby realizing the separation of at least part of the downlink signals and, thus, improving the network energy efficiency.

BRIEF DESCRIPTION OF DRAWINGS

To describe the technical solutions in embodiments of the present invention more clearly, the following briefly introduces the accompanying drawings needed for describing the embodiments. Apparently, the accompanying drawings in the following description illustrate merely some embodiments of the present invention, and persons of ordinary skill in the art may still derive other drawings from these accompanying drawings without creative effort.

DESCRIPTION OF EMBODIMENTS

To make the objectives, technical solutions, and advantages of embodiments of the present invention clearer, the following clearly and comprehensively describes the technical solutions in embodiments of the present invention with reference to the accompanying drawings in embodiments of the present invention. Apparently, the described embodiments are merely a part rather than all embodiments of the present invention. All other embodiments obtained by persons of ordinary skill in the art based on embodiments of the present invention without creative effort shall fall within the protection scope of the present invention.

Figure 1:
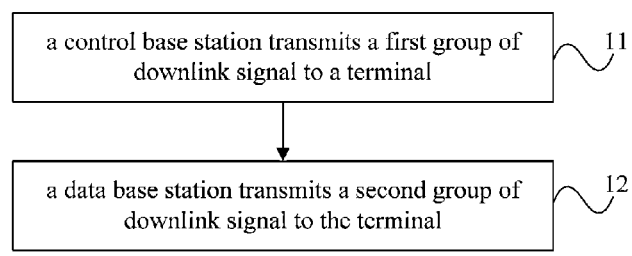
FIG. 1 is a schematic flowchart of a method for transmitting a downlink signal according to an embodiment of the present invention.

FIG. 1 is a schematic flowchart of a method for transmitting a downlink signal according to an embodiment of the present invention, and it includes:

step 11: a control base station transmits a first group of downlink signal to a terminal.

step 12: a data base station transmits a second group of downlink signal to the terminal.

The first group of downlink signal is at least partially different from the second group of downlink signal.

The first group of downlink signal and the second group of downlink signal enable the terminal to implement a network function according to the first group of downlink signal and/or the second group of downlink signal.

In the network planning, it may be pre-planned which base stations are control stations, and which stations are data base stations, so as to respectively transmit the downlink signals which are at least partially different.

Figure 2:
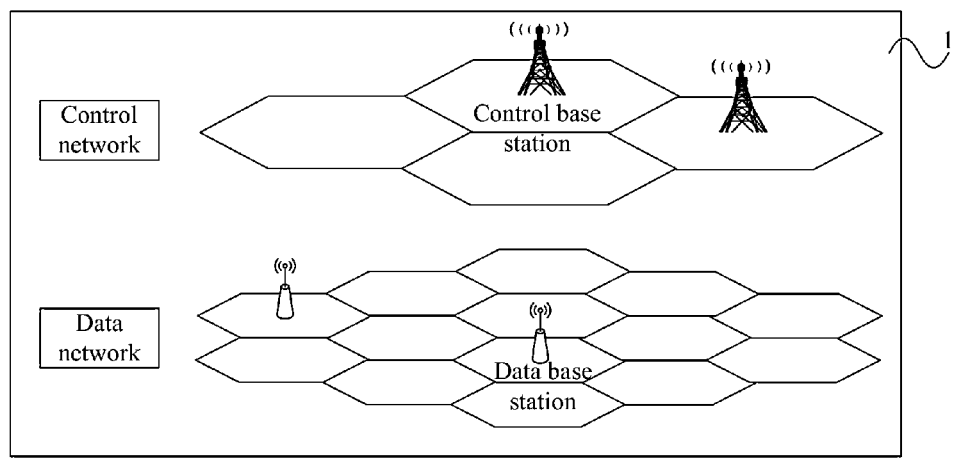
FIG. 2 is a schematic diagram of a division of a network system according to an embodiments of the present invention.

Referring to FIG. 2, embodiments of the present invention divides the network system 1, for example the GSM/EDGE radio access network (GSM EDGE Radio Access Network, GERAN), the universal terrestrial radio access network (Universal Terrestrial Radio Access Network, UTRAN) or the evolved universal terrestrial radio access network (Evolved Universal Terrestrial Radio Access Network, E-UTRAN), into two layers, of which one layer is the control network and the other layer is the data network. The control network provides continuous coverage, the data network provides continuous or discontinuous coverage, and the corresponding base stations are called the control base stations or the data base stations. In this network architecture, the control network is mainly responsible for the accessibility of the network, that is, ensuring that a user can quickly access to the control network after the user starts up, and also responsible for part of low-speed traffic transmission of users, while the data network mainly responsible for high-speed data transmission of users.

Figure 3:
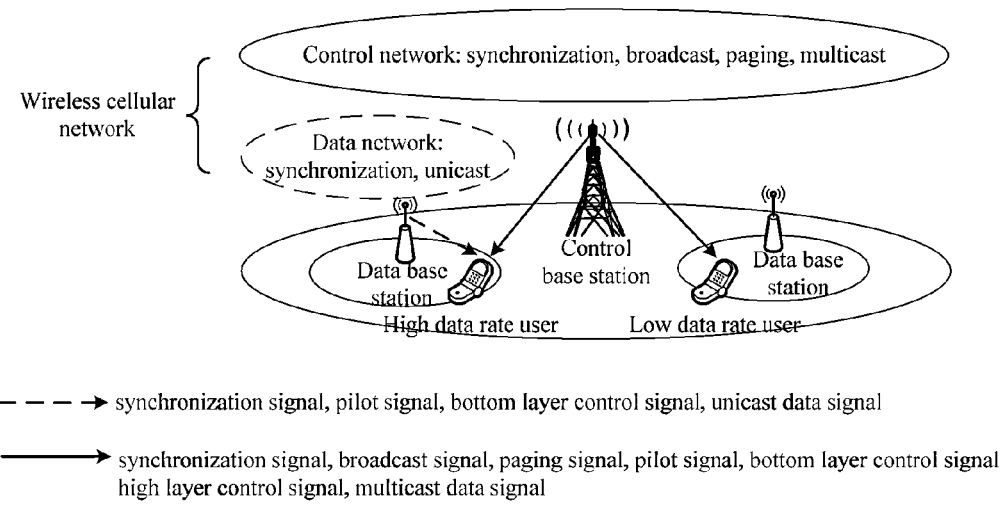
FIG. 3 is a schematic diagram of a downlink signal transmitted by a control base station and a data base station according to an embodiments of the present invention.

As shown in FIG. 3, the first group of downlink signals transmitted by the control base station may include: a synchronization signal, a broadcast signal, a paging signal, a multicast data signal, a high layer dedicated control signal, a bottom layer control signal and a pilot signal. The synchronization signal, the broadcast signal and the paging signal can ensure the network coverage and the network functions necessary for the accessibility of the network, for example, the synchronization function, the broadcast function, the paging function, and etc; the multicast data signals are divided into two kinds, one is the public multicast data signal, which bears weather forecast information, multimedia broadcast information such as a video, and is used for implementing the multicast function of the network, the other is the dedicated broadcast data signal, which is used for bearing low-speed data of the user of the terminal and the high layer dedicated control signal, and providing low-speed traffic transmission service for the terminal user, for example, the network attachment, location updating, low-speed voice services, etc; the bottom layer control signal and the pilot signal are used for assisting the implementation of these network functions and network services described above, for example, data receiving and demodulation, channel measurements, precise synchronization in time and frequency, etc.

The second group of downlink signals transmitted by the data base station may include: the synchronization signal, the unicast data signal, the bottom layer control signal and the pilot signal. The synchronization signal is used for implementing the synchronization in time and in frequency between the terminal user and the data base station; the unicast data signal is used for providing point-to-point high-speed data transmission service to the terminal user; the bottom layer control signal and the pilot signal are used for assisting the terminal user in implementing these network functions and network services described above, such as receiving and demodulating the unicast data signal, and necessary channel measurements.

Of course, the aforementioned first group of downlink signals and second group of downlink signals are only examples, there may also be other manners, for example, the first group of downlink signals includes: the synchronization signal, the broadcast signal, the paging signal, the multicast data signal, the high layer dedicated control signal, the bottom layer control signal and the pilot signal; or, the synchronization signal, the broadcast signal, the paging signal, the unicast data signal, the multicast data signal, the high layer dedicated control signal, the bottom layer control signal and the pilot signal.

The second group of downlink signals includes: the synchronization signal, the unicast data signal and the pilot signal; or, the synchronization signal, the unicast data signal, the pilot signal and at least one of the following: the multicast data signal, the high layer dedicated control signal and the bottom layer control signal.

The terminal in the network simultaneously receives the downlink signals issued from the control network and the data network, so as to implement the complete network services such as network residing, high-speed and low-speed data transmission.

Figure 4:
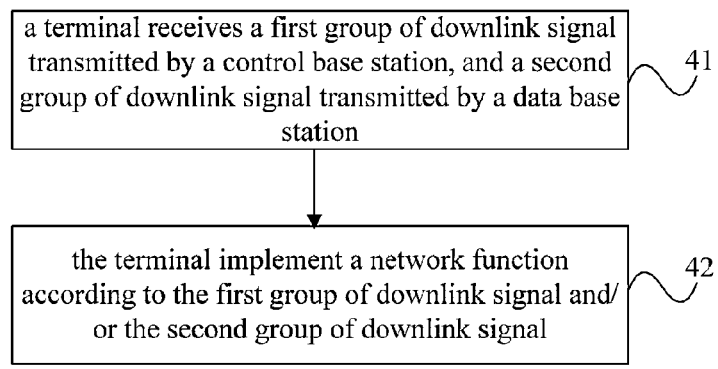
FIG. 4 is schematic flowchart of a method for receiving a downlink signal according to an embodiment of the present invention.

Accordingly, FIG. 4 is schematic flowchart of a method for receiving a downlink signal according to an embodiment of the present invention, the method includes:

step 41: a terminal receives a first group of downlink signal transmitted by a control base station, and a second group of downlink signal transmitted by a data base station, where the first group of downlink signal is at least partially different from the second group of downlink signal;

step 42: the terminal implement a network function according to the first group of downlink signal and/or the second group of downlink signal.

Figure 5:
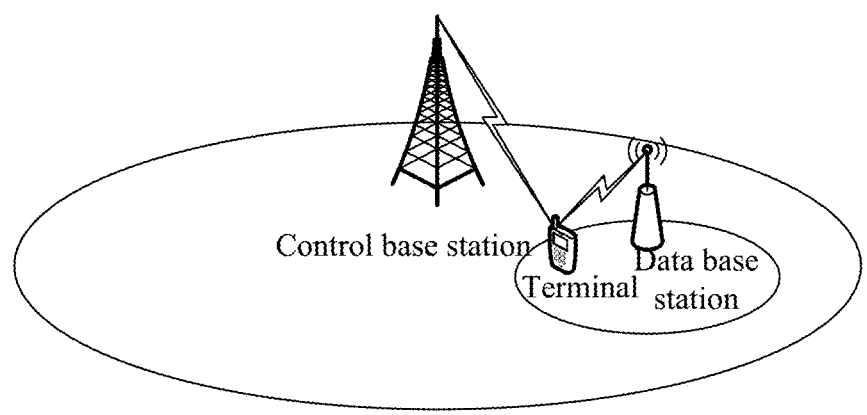
FIG. 5 is a schematic diagram of receiving a downlink signal by a terminal according to an embodiment of the present invention.

Referring to FIG. 5, in this embodiment, the downlink signals received by the terminal are respectively from the control base station and the data base station, the terminal may simultaneously maintain the synchronization in time and in frequency with both the control base station and the data base station, and receive the downlink signals from the control base station and the data base station, for example, when the terminal receives the point-to-point unicast data signal issued by the data base station, the terminal can simultaneously receive the paging signal, the broadcast signal and etc transmitted by the control base station.

In this embodiment, the control base station and the data base station are separated, and the control base station and the data base station transmit downlink signals to the terminal, respectively, thereby realizing the separation of at least part of the downlink signals and, thus, improving the network energy efficiency.

Figure 6:
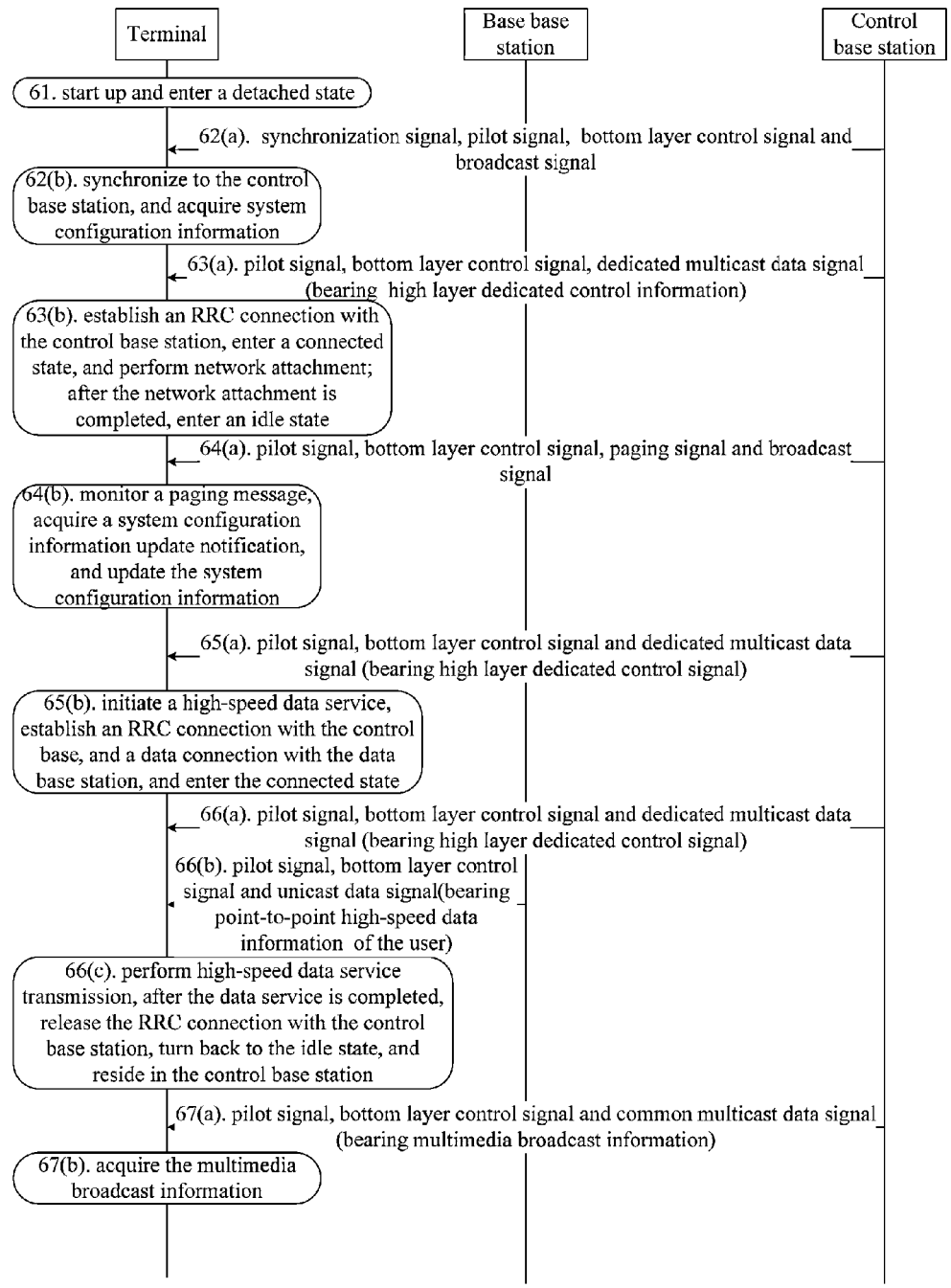
FIG. 6 is a schematic flowchart of a method for receiving a downlink signal according to another embodiment of the present invention.
Figure 7:
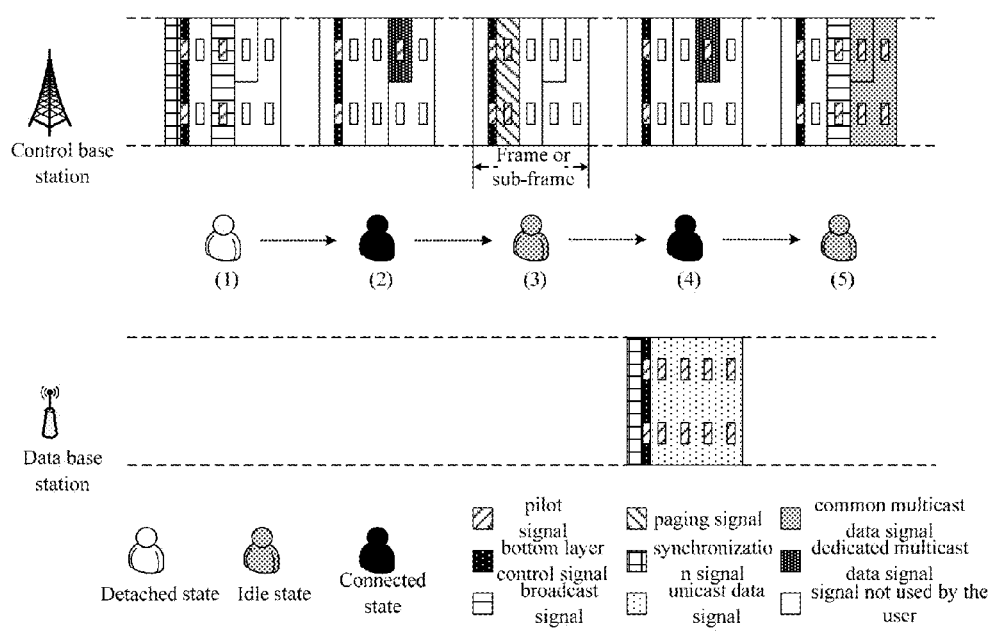
FIG. 7 is a schematic diagram of a frame structure corresponding to FIG. 6.

FIG. 6 is a schematic flowchart of a method for transmitting a downlink signal according to another embodiment of the present invention, FIG. 7 is a schematic diagram of a frame structure corresponding to FIG. 6.

In the conventional wireless cellular network, the terminal usually has the following three states:

(1) detached state: in this state, the terminal has not accessed the network, and cannot perform any form of data transmission with the network; an example of this state is the LTE_DETACHED state in the E-UTRAN;

(2) idle state: in this state, the terminal has already accessed the network, but does not have an RRC connection with the network, and can not perform the unicast data transmission with the network. An example of this state is the LTE_IDLE state in the E-UTRAN;

(3) connected state: in this state, the user has already accessed the network, and has the RRC connection with the network, and can perform the unicast data transmission with the network. An example of this state is the LTE_ACTIVE state in the E-UTRAN.

In this embodiment, the terminal will at least reside in the control base station after the terminal starts up, and may simultaneously reside in the data base station only when the terminal needs the high-speed data service.

Referring to FIG. 6, this embodiment includes:

step 61: a terminal enters a detached state after starting up;

step 62(a): a control base station transmits a synchronization signal, a pilot signal, a bottom layer control signal and a broadcast signal to the terminal;

step 62(b): the terminal synchronizes to the control base station, and acquires system configuration information.

In this step, the terminal reads the synchronization signal issued by the control station, so as to implement the synchronization in time and in frequency with the control base station; reads the bottom layer control signal, the pilot signal and the broadcast signal issued by the control station, so as to obtain the system configuration information of the control base station and the adjacent data base station, the broadcast signal issued by the control base station simultaneously bears the system configuration information of the control base station and the adjacent data base station.

Step 63(a): the control base station transmits a pilot signal, a bottom layer control signal and a dedicated multicast data signal to the terminal, where the dedicated multicast data signal bears a high layer dedicated control signal.

Step 63(b): the terminal establishes an RRC connection with the control base station, enters a connected state, and performs network attachment; after the network attachment is completed, the terminal may release the RRC connection, and enter an idle state.

In this step, the terminal may establish the RRC connection with the control base station according to the high layer dedicated control signal.

Step 64(a): the control base station transmits a pilot signal, a bottom layer control signal, a paging signal and a broadcast signal to the terminal.

Step 64(b): the terminal monitors a paging message, acquires a system configuration information update notification, and updates the system configuration information.

The terminal in idle state monitors the paging message, judges whether the system configuration information has been updated, and acquires the updated system configuration information through the broadcast signal; the terminal may also judges whether called information of the terminal exists by monitoring the paging signal.

Step 65(a): the control base station transmits a pilot signal, a bottom layer control signal and a dedicated multicast data signal to the terminal, where the dedicated multicast data signal bears a high layer dedicated control signal.

Step 65(b): the terminal initiates a high-speed data service, establishes an RRC connection with the control base, and a data connection with the data base station, and enters the connected state.

The terminal may establish the RRC connection with the control base station according to the high layer dedicated control signal; when establishing the RRC connection, the terminal may establish the data connection with the data base station according to the interacted RRC signaling.

Step 66(a): the control base station transmits a pilot signal, a bottom layer control signal and a dedicated multicast data signal to the terminal, where the dedicated multicast data signal bears a high layer dedicated control signal.

Step 66(b): the data base station transmits a synchronization signal, a pilot signal, a bottom layer control signal and a unicast data signal to the terminal.

Step 66(c): the terminal performs high-speed data service transmission. After the data service is completed, the terminal releases the RRC connection with the control base station, turns back to the idle state, and resides in the control base station.

The terminal may acquire the high layer dedicated control signal according to the pilot signal, the bottom layer control signal and the dedicated multicast data signal transmitted by the control base station.

The terminal implements the synchronization in time and in frequency with the data base station according to the synchronization signal transmitted by the data station.

The unicast data signal bears point-to-point high-speed data information, the terminal implements the unicast function according to the high layer dedicated control signal, the pilot signal, the bottom layer control signal and the unicast data signal transmitted by the data base station.

Step 67(a): the control base station transmits a pilot signal, a bottom layer control signal and a common multicast data signal to the terminal, where the common multicast data signal bears multimedia broadcast information.

Step 67(b): the terminal acquires the multimedia broadcast information.

The multimedia broadcast information may be, for example, weather forecasts, videos, and so on.

Figure 8:
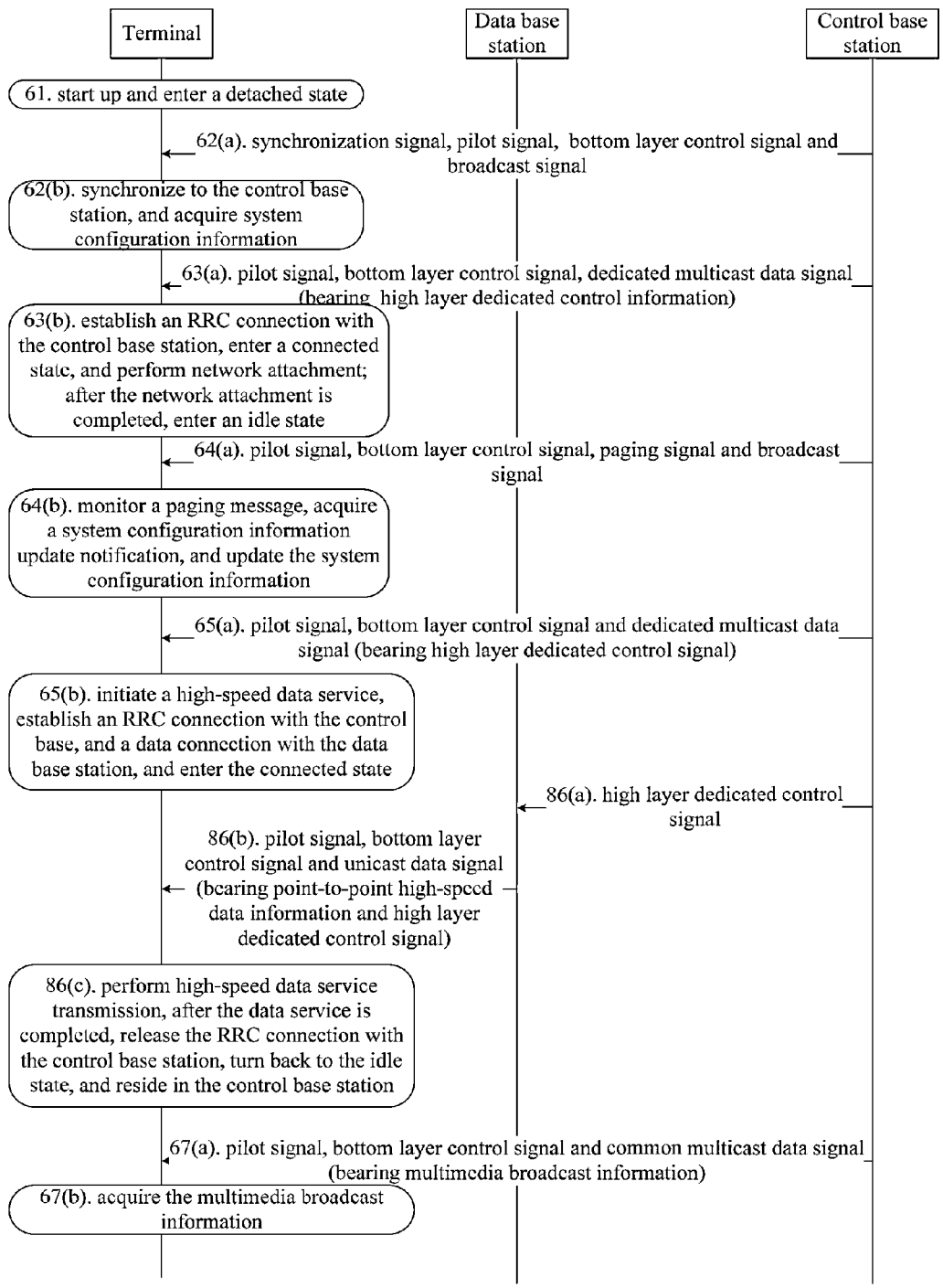
FIG. 8 is a schematic flowchart of a method for transmitting a downlink signal according to another embodiment of the present invention.

In this embodiment, the high layer dedicated control signal needed in implementing the unicast function is transmitted to the terminal by the control base station. Alternatively, with reference to FIG. 8, the high layer dedicated control signal may also be transmitted to the base station data by the control base station, and then transmitted to the terminal by the data base station. The other steps may specifically refer to the last embodiment.

Step 61: a terminal enters a detached state after starting up.

Step 62(a): the control base station transmits a synchronization signal, a pilot signal, a bottom layer control signal and a broadcast signal to the terminal.

Step 62(b): the terminal synchronizes to the control base station, and acquires system configuration information.

Step 63(a): the control base station transmits a pilot signal, a bottom layer control signal and a dedicated multicast data signal to the terminal, where the dedicated multicast data signal bears a high layer dedicated control signal.

Step 63(b): the terminal establishes an RRC connection with the control base station, enters a connected state, and performs network attachment; after the network attachment is completed, the terminal may release the RRC connection, and enter an idle state.

Step 64(a): the control base station transmits a pilot signal, a bottom layer control signal, a paging signal and a broadcast signal to the terminal.

Step 64(b): the terminal monitors a paging message, acquires a system configuration information update notification, and updates the system configuration information.

Step 65(a): the control base station transmits a pilot signal, a bottom layer control signal and a dedicated multicast data signal to the terminal, where the dedicated multicast data signal bears a high layer dedicated control signal.

Step 65(b): the terminal initiates a high-speed data service, establishes an RRC connection with the control base, and a data connection with the data base station, and enters the connected state.

The terminal establishes the RRC connection with the control base station according to the pilot signal, the bottom layer control signal and the high layer dedicated control signal.

Step 86(a): the control base station transmits a high layer dedicated control signal to the data base station.

Step 86(b): the data base station transmits a synchronization signal, a pilot signal, a bottom layer control signal and a unicast data signal to the terminal, where the unicast data signal bears point-to-point high-speed data information and the high layer dedicated control signal transmitted by the control base station.

Step 86(c): the terminal performs high-speed data service transmission. After the data service is completed, the terminal releases the RRC connection with the control base station, turns back to the idle state, and resides in the control base station.

Step 67(a): the control base station transmits a pilot signal, a bottom layer control signal and a common multicast data signal to the terminal, where the common multicast data signal bears multimedia broadcast information.

Step 67(b): the terminal acquires the multimedia broadcast information.

In summary, the logical link for issuing the high layer dedicated control signal that the terminal needs to acquire is: the core network, specifically such as the mobility management entity (Mobility Management Entity, MME) in the LTE→the control base station→the terminal; whereas the physical link has two options, where one is: the core network, such as the MME→the control base station→the terminal, and the other is: the core network, such as the MME→the control base station→the data base station→the terminal user. The latter one distinguishes from the previous one in that, the high layer dedicated control signal is not transmitted directly to the terminal through the air interface between the control base station and the terminal, but is forwarded by the control base station to the data base station through an interface between the control base station and the data base station, then issued to the terminal by the data base station through the air interface between the data base station and the terminal.

Figure 9:
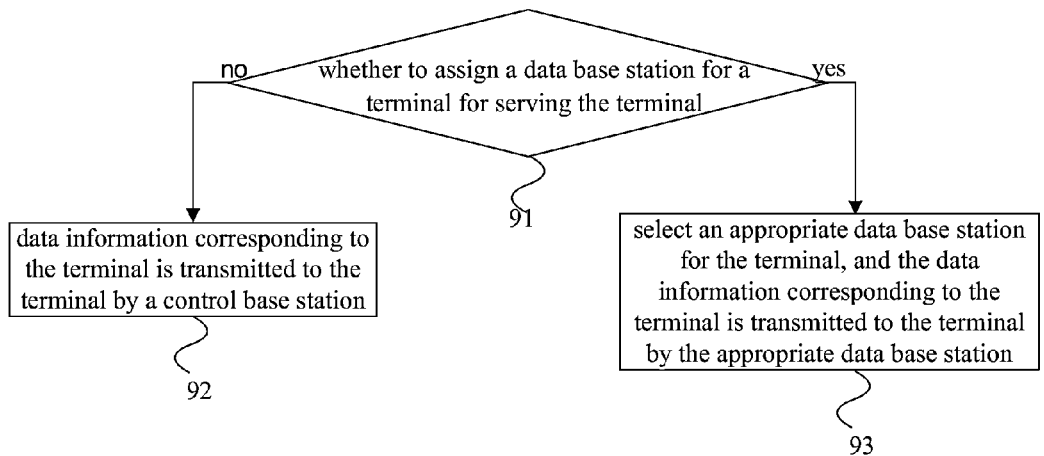
FIG. 9 is a schematic flowchart of a method for transmitting a downlink signal according to another embodiment of the present invention.

FIG. 9 is a schematic flowchart of a downlink signal transmitting method according to another embodiment of the present invention, and it includes:

step 91: a judging node judges whether to assign a data base station for a terminal for serving the terminal according to status information of the user, if yes, performs step 93, otherwise, performs step 92;

step 92: data information corresponding to the terminal is transmitted to the terminal by a control base station;

step 93: select an appropriate data base station for the terminal, and the data information corresponding to the terminal is transmitted to the terminal by the appropriate data base station.

The judging node is a logical functional entity which selects the serving data base station for the terminal user, its physical entity may be positioned on the control base station or on an ancestor node of the base station. The entity has the following two functions: 1) determining whether to assign a data base station to a terminal for serving the terminal, that is, determining whether the data information issued from the core network to the terminal is issued by the data base station or by the control base station serving the terminal; 2) assigning an appropriate data base station to serve the terminal.

In this embodiment, the service types may be classified, small packet services such as the voice service (for example, VoIP) and instant Messaging (for example, QQ, MSN) are classified as the first class service, and other services (for example, FTP, WWW) are classified as the second class service.

The state information of the user may include, but are not limited to, the following information:

(1) service type information of the service currently used by the terminal: the information may be acquired through the following ways: a selecting function entity of the serving data base station judges by itself the service type to which the service currently used by the terminal belongs, or the core network performs the judgment and informs the result to the function entity; for example, the first class service or the second class service as described above;

(2) location information of the terminal: the information may be acquired through the following ways: the control base station positions the terminal, or the terminal positions itself (for example, by using the GPS system) and reports to the control base station, the control base station informs the information to the function entity;

(3) moving speed information of the terminal: the information may be acquired through the following ways: the control base station measures the moving speed of the terminal, or the terminal measures the moving speed of the terminal itself (for example, by using the GPS system) and reports to the control base station, the control base station informs the information to the function entity;

(4) a signal intensity and/or quality information of a signal received by the terminal from a nearby data base station: the information may be acquired through the following ways: the terminal measures the signal intensity and the signal quality of the nearby data base station and reports to the control base station, the control base station informs the information to the function entity.

In the step 91, do not assign a serving base station to the terminal if one of the following conditions is satisfied: 1) all the services currently used by the terminal belong to the first class service; 2) the moving speed of the terminal is higher than a preset value, or the terminal is identified as a high speed terminal; 3) the distance between the terminal and a nearest base station exceeds a preset threshold value; 4) the quality and/or the signal intensity of the signal received by the terminal from the data base station, of which the signal quality and/or the signal intensity is the best, is lower than a preset threshold value.

In the embodiments of the present invention, the terminal, of which the speed exceeds a certain threshold, or which performs the handover between base stations frequently within a preset time, and the times of the handover exceeds a certain threshold, is called high speed terminal.

In embodiments of the present invention, the above first class service may be called the low-speed service, the second class service may be called the high-speed service.

The method for selecting the appropriate data base station in step 93 may be, but is not limited to, as the following: 1) selecting the data base station which is nearest to the terminal as the serving data base station of the terminal according to the location information of the terminal; 2) or, selecting the data base station of which the signal intensity and/or quality is the best as the serving data base station of the terminal according to the signal intensity and/or quality information of signals received by the terminal from nearby data base stations.

Figure 10:
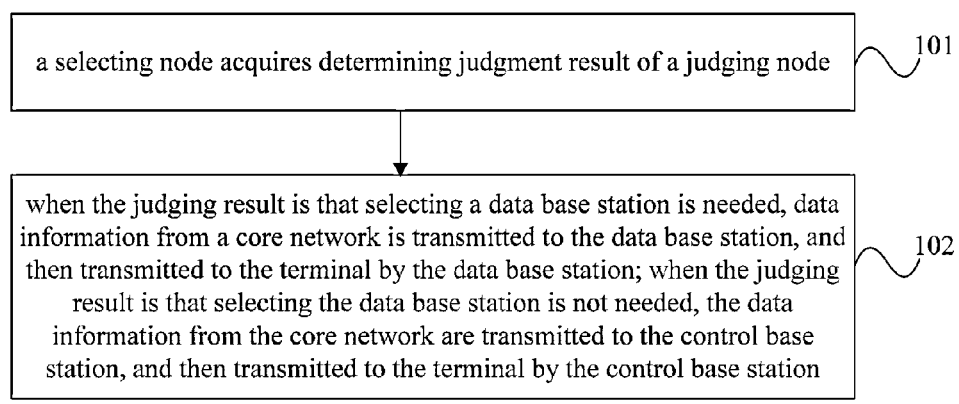
FIG. 10 is a schematic flowchart of a method for transmitting a downlink signal according to another embodiment of the present invention.

FIG. 10 is a schematic flowchart of a method for transmitting a downlink signal according to another embodiment of the present invention, and the method includes:

step 101: a selecting node acquires determining judgment result of a judging node;

step 102: when the judging result is that selecting a data base station is needed, data information from a core network is transmitted to the data base station, and then transmitted to the terminal by the data base station; when the judging result is that selecting the data base station is not needed, the data information from the core network are transmitted to the control base station, and then transmitted to the terminal by the control base station.

Figure 11:
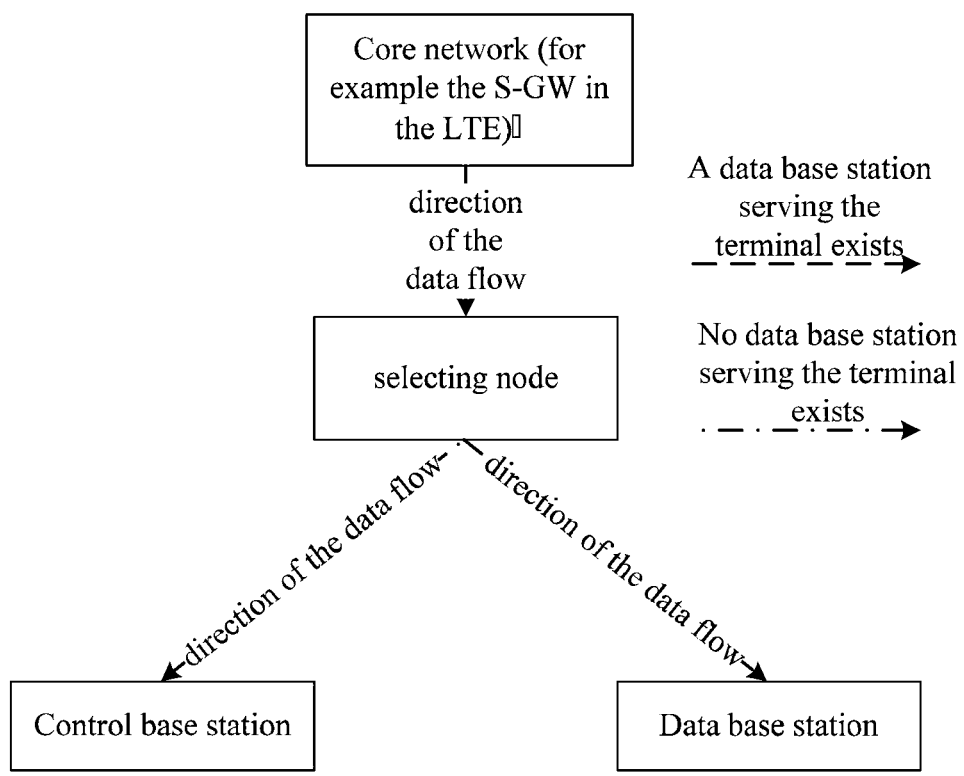
FIG. 11 is a schematic diagram of transmission of a downlink signal according to an embodiment of the present invention.

The selecting node is a logical functional entity which selects the direction of the terminal user data flow, its physical entity may be on positioned the control base station or on an ancestor node of the base station. This functional entity determines the direction of the flow of the data information of the terminal issued by the core network (for example, the Serving-GW in the LTE), that is, issuing the data information to the terminal user through which base station (the control base station or the data base station which serves the user). As shown in FIG. 11, if a terminal has a serving data base station (the logical functional entity may learn through the selecting logical functional entity of the serving data base station whether there is a data base station and which data base station serves the terminal user), then the entity forwards the data information of the terminal user issued by the core network to the data base station serving the terminal user, and the data base station issues the data information to the terminal user through the air interface; if a terminal has no serving data base station, then the entity forwards the data information of the terminal user issued by the core network to the control base station serving the terminal user, and the control base station issued the data information to the terminal user through the air interface.

In embodiments of the present invention, since the public control signaling (such as broadcast, paging and pilots for measuring, and so on) ensuring the network coverage and user access are all borne by the control base station, the data base station may turn off the air interface and do not transmit any content at the time when having no data to issue, comparing to the capacity station in the heterogeneours network (Heterogeneous network, HetNet) and the signaling cutting (at the time when there is no data, the capacity station still needs to issue some signals, such as broadcast and pilot, so the air interface can not be turned off), the data base station can be turned off more likely, and with longer time, therefore, the energy saving effect is more obvious. In addition, differing from the beyond cellular green (Beyond Cellular Green, BCG), bearing the delay-sensitive low-speed services such as voice service by the control network can ensure better QoS (in BGG, an appropriate data base station should be assigned to bear services before the service is established), meanwhile can avoid frequently issuing a large number of control signalings and pilots and etc by the data network for bearing these low-speed services, therefore, the signaling overhead can be reduced; since all users in the detached state (Detached) and users in the idle state (Idle) reside in the control network, the reconfiguration of the data base station may be more flexible, for example, it may not like the HetNet, in which the turning on or turning off of the capacity station will cause the move of the idle terminal user and thus may bring a delay in establishing service, therefore, a more flexible reconfiguration may be achieved; since the control network is only responsible for the transmission of the control signaling and the low-speed data, the change of the power of the air interface will not be obvious, so the power amplifier (Power Amplifier, PA) may always work with a high efficiency (a large change of the power of the air interface, such as the air interface of the marco base station in the HetNet, will result in that the PA cannot always keep a high efficiency, and complex dynamic voltage regulation technology is needed), therefore, there is more space for network optimization design and implementation.

Figure 12:
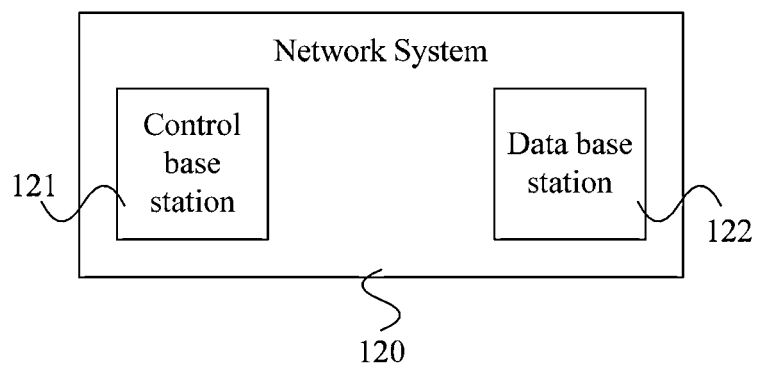
FIG. 12 is a schematic structural diagram of a network system according to an embodiment of the present invention.

FIG. 12 is a schematic structural diagram of a network system according to an embodiment of the present invention. The system 120 includes a control base station 121 and a data base station 122; the control base station 121 is configured to transmit a first group of downlink signal to a terminal; the data base station 122 is configured to transmit a second group of downlink signal to the terminal; the first group of downlink signal is at least partially different from the second group of downlink signal; the first group of downlink signal and the second group of downlink signal enable the terminal to implement a network function according to the first group of downlink signal and/or the second group of downlink signal.

Optionally, the first group of downlink signals transmitted by the control base station includes: a synchronization signal, a broadcast signal, a paging signal, a multicast data signal, a high layer dedicated control signal, a bottom layer control signal and a pilot signal; or, a synchronization signal, a broadcast signal, a paging signal, a unicast data signal, a multicast data signal, a high layer dedicated control signal, a bottom layer control signal and a pilot signal.

The second group of downlink signals transmitted by the data base station includes: a synchronization signal, a unicast data signal and a pilot signal; or, a synchronization signal, a unicast data signal, a pilot signal and at least one of the following: a multicast data signal, a high layer dedicated control signal and a bottom layer control signal.

Optionally, the control base station is specifically configured to:

transmit the synchronization signal to the terminal, so that the terminal implements the synchronization function with the control base station; or transmit the pilot signal, the bottom layer control signal and the broadcast signal to the terminal, so that the terminal implements the broadcast function after the terminal is synchronized to the control base station; or transmit the pilot signal, the bottom layer control signal and a common multicast data signal bearing multimedia information to the terminal, so that the terminal implements the multicast function after the terminal is synchronized to the control base station; or transmit the pilot signal, the bottom layer control signal and the paging signal to the terminal, so that the terminal implements the paging function after the terminal is synchronized to the control base station.

Optionally, the control base station is specifically configured to transmit the pilot signal, the bottom layer control signal and a dedicated multicast data signal bearing a high layer dedicated control signal to the terminal; and the data base station is specifically configured to transmit the synchronization signal, the pilot signal, the bottom layer control signal and the unicast data signal bearing unicast data information to the terminal, so that the terminal synchronizes to the data base station and implements the unicast function; or the control base station is specifically configured to transmit the high layer dedicated control signal to the data base station; and the data base station is specifically configured to transmit the synchronization signal, the pilot signal, the bottom layer control signal and the unicast data signal bearing the high layer dedicated control signal and the unicast data information to the terminal, so that the terminal synchronizes to the data base station and implements the unicast function.

Optionally, the system further includes:

a judging node, configured to judge whether to assign a data base station for the terminal, if yes, then determine the data base station, so that data information from a core network is transmitted to the terminal via the data base station.

Optionally, the judging node is specifically configured to:

when at least one of the following items is satisfied, judge that assigning the data base station for the terminal is not needed, otherwise judge that assigning the data base station is needed:

a service currently used by the terminal belongs to a preset service for which assigning the data base station is not needed;

a moving speed of the terminal is higher than a preset value, or the terminal is identified as a high speed terminal;

a distance between the terminal and a nearest base station exceeds a preset threshold value;

a signal quality of a signal received by the terminal from the data base station, of which the signal quality is the best, is lower than a preset threshold value, or, a signal intensity of a signal received by the terminal from the data base station, of which the signal intensity is the best, is lower than a preset threshold value.

Optionally, the judging node is specifically configured to:

determine that the data base station is a base station which is nearest to the terminal; or determine that the data base station is a base station from which the signal quality of the signal received by the terminal is the best, or is a base station from which the signal intensity of the signal received by the terminal is the best.

Optionally, the system further includes: a selecting node, configured to transmit the data information from the core network to the data base station when the judging node judges that assigning the data base station to the terminal is needed, so that the data base station transmits the data to the terminal; or transmit the data information from the core network to the control base station when the judging node judges that assigning the data base station to the terminal is not needed, so that the control base station transmits the data to the terminal.

In this embodiment, according to the above technical solution, different base stations transmits downlink signals to the same terminal, respectively, thereby realizing the separation of at least part of the downlink signals and, thus, improving the network energy efficiency.

Figure 13:
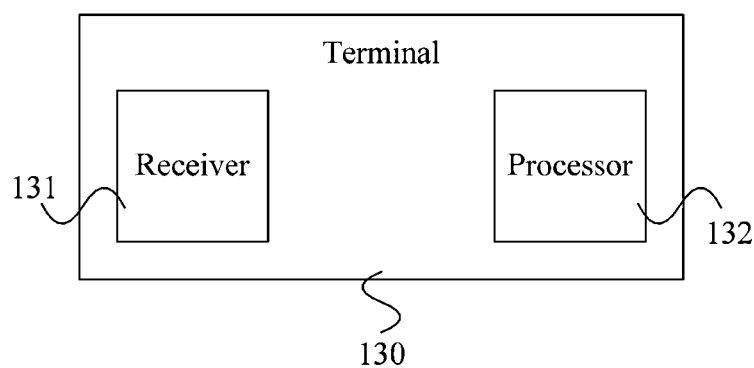
FIG. 13 is a schematic structural diagram of a terminal according to an embodiment of the present invention.

FIG. 13 is a schematic structural diagram of a terminal according to an embodiment of the present invention. The terminal 130 includes a receiver 131 and a processor 132; the receiver 131 is configured to receive a first group of downlink signal transmitted by a control base station, and a second group of downlink signal transmitted by a data base station, where the first group of downlink signal is at least partially different from the second group of downlink signal; the processor 132 is configured to implement a network function according to the first group of downlink signal and/or the second group of downlink signal.

Optionally, the first group of downlink signals received by the receiver includes: a synchronization signal, a broadcast signal, a paging signal, a multicast data signal, a high layer dedicated control signal, a bottom layer control signal and a pilot signal; or, a synchronization signal, a broadcast signal, a paging signal, a unicast data signal, a multicast data signal, a high layer dedicated control signal, a bottom layer control signal and a pilot signal;

the second group of downlink signals received by the receiver includes: a synchronization signal, a unicast data signal and a pilot signal; or, a synchronization signal, a unicast data signal, a pilot signal and at least one of the following: a multicast data signal, a high layer dedicated control signal and a bottom layer control signal.

Optionally, the processor is specifically configured to:

implement a synchronization function with the control base station according to the synchronization signal transmitted by the control base station; or implement a broadcast function after synchronizing to the control base station, according to the pilot signal, the bottom layer control signal and the broadcast signal which are transmitted by the control base station; or, implement a multicast function after synchronizing to the control base station, according to the pilot signal, the bottom layer control signal and a public multicast data signal bearing multimedia information which are transmitted by the control base station; or, implement a paging function after synchronizing to the control base station, according to the pilot signal, the bottom layer control signal and the paging signal which are transmitted by the control base station.

Optionally, the processor is specifically configured to:

implement a unicast function after synchronizing to the data base station, according to the pilot signal, the bottom layer control signal and a dedicated multicast data signal bearing a high layer dedicated control signal which are transmitted by the control base station, and the synchronization signal, the pilot signal, the bottom layer control signal and the unicast data signal bearing unicast data information which are transmitted by the data base station; or implement the unicast function after synchronizing to the data base station, according to the synchronization signal, the pilot signal, the bottom layer control signal and the unicast data signal bearing the high layer dedicated control signal and the unicast data information which are transmitted by the data base station, where the high layer dedicated control signal is transmitted to the data base station by the control base station.

In this embodiment, according to the above technical solution, different base stations transmits downlink signals to the same terminal, respectively, thereby realizing the separation of at least part of the downlink signals and, thus, improving the network energy efficiency.

Persons of ordinary skill in the art may understand that all or a part of the steps of the methods according to embodiments of the present invention may be implemented by a program instructing relevant hardware. The program may be stored in a computer readable storage medium. When the program runs, the steps of the methods according to the embodiments are performed. The storage medium may be any medium that is capable of storing program codes, such as a ROM, a RAM, a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent substitutions to some technical features thereof, without departing from the scope of the technical solutions of embodiments of the present invention.

What is claimed is:

1. A method for transmitting a downlink signal, comprising:

transmitting, by a control base station, a pilot signal, a bottom layer control signal and a dedicated multicast data signal bearing a high layer dedicated control signal to a terminal;

transmitting, by a data base station, a synchronization signal, a pilot signal, a bottom layer control signal and a unicast data signal bearing unicast data information to the terminal; wherein:

the high layer dedicated control signal is acquired by the terminal according to the pilot signal, the bottom layer control signal and the dedicated multicast data signal transmitted by the control base station;

the synchronization in time and in frequency with the data base station is implemented by the terminal according to the synchronization signal transmitted by the data base station; and a unicast function is implemented by the terminal according to the pilot signal, the bottom layer control signal and the unicast data signal transmitted by the data base station and the high layer dedicated control signal.

2. The method according to claim 1, further comprising:

judging, by a judging node, whether to assign the data base station for the terminal, if judging to assign the data base station for the terminal, then determining the data base station, so that data information from a core network are transmitted to the terminal via the data base station.

3. The method according to claim 2, wherein the judging whether to assign the data base station for the terminal, comprises:

when at least one of following items is satisfied, judging that assigning the data base station for the terminal is not needed, otherwise judging that assigning the data base station is needed:

a service currently used by the terminal belongs to a preset service for which assigning the data base station is not needed;

a moving speed of the terminal is higher than a preset value, or the terminal is identified as a high speed terminal; a distance between the terminal and a nearest base station exceeds a preset threshold value;

a signal quality of a signal received by the terminal from the data base station, of which the signal quality is the best, is lower than a preset threshold value, or, a signal intensity of a signal received by the terminal from the data base station, of which the signal intensity is the best, is lower than a preset threshold value.

4. The method according to claim 2, wherein the determining the data base station, comprises:
determining that the data base station is a base station which is nearest to the terminal; or
determining that the data base station is a base station from which a signal quality of a signal received by the terminal is the best, or is a base station from which a signal intensity of a signal received by the terminal is the best.

5. The method according to claim 2, further comprising:
when the judging node judges that assigning the data base station to the terminal is needed, transmitting, by a selecting node, the data information from the core network to the data base station, so that the data base station transmits the data information to the terminal; or
when the judging node judges that assigning the data base station to the terminal is not needed, transmitting, by the selecting node, the data information from the core network to the control base station, so that the control base station transmits the data information to the terminal.

6. A network system, comprising:
a control base station is configured to transmit a pilot signal, a bottom layer control signal and a dedicated multicast data signal bearing a high layer dedicated control signal to a terminal; and
a data base station is configured to transmit a synchronization signal, a pilot signal, a bottom layer control signal and a unicast data signal bearing unicast data information to the terminal; wherein:
the high layer dedicated control signal is acquired by the terminal according to the pilot signal, the bottom layer control signal and the dedicated multicast data signal transmitted by the control base station;
the synchronization in time and in frequency with the data base station is implemented by the terminal according to the synchronization signal transmitted by the data station; and
a unicast function is implemented by the terminal according to the pilot signal, the bottom layer control signal and the unicast data signal transmitted by the data base station and the high layer dedicated control signal.

7. The system according to claim 6, further comprising:
a judging node, configured to judge whether to assign the data base station for the terminal, if judging to assign the data base station for the terminal, then determine the data base station, so that data information from a core network is transmitted to the terminal via the data base station.

8. The system according to claim 7, wherein the judging node is configured to:
when at least one of the following items is satisfied, judge that assigning the data base station for the terminal is not needed, otherwise judge that assigning the data base station is needed:
a service currently used by the terminal belongs to a preset service for which assigning the data base station is not needed;
a moving speed of the terminal is higher than a preset value, or the terminal is identified as a high speed terminal; a distance between the terminal and a nearest base station exceeds a preset threshold value;
a signal quality of a signal received by the terminal from the data base station, of which the signal quality is the best, is lower than a preset threshold value, or, a signal intensity of a signal received by the terminal from the data base station, of which the signal intensity is the best, is lower than a preset threshold value.

9. The system according to claim 7, wherein the judging node is configured to:
determine that the data base station is a base station which is nearest to the terminal; or
determine that the data base station is a base station from which a signal quality of a signal received by the terminal is the best, or is a base station from which a signal intensity of a signal received by the terminal is the best.

10. The system according to claim 7, further comprising:
a selecting node, configured to, when the judging node judges that assigning the data base station to the terminal is needed, transmit the data information from the core network to the data base station, so that the data base station transmits the data information to the terminal; or, when the judging node judges that assigning the data base station to the terminal is not needed, transmit the data information from the core network to the control base station, so that the control base station transmits the data information to the terminal.

11. A terminal, comprising:
a receiver, configured to receive a pilot signal, a bottom layer control signal and a dedicated multicast data signal bearing a high layer dedicated control signal which are transmitted by a control base station and a synchronization signal, a pilot signal, a bottom layer control signal and a unicast data signal bearing unicast data information which are transmitted by a data base station;
a processor, configured to synchronize to the data base station, and then implement a unicast function, according to the pilot signal, the bottom layer control signal and the dedicated multicast data signal bearing the high layer dedicated control signal which are transmitted by the control base station, and the synchronization signal, the pilot signal, the bottom layer control signal and the unicast data signal bearing unicast data information which are transmitted by the data base station; wherein:
the high layer dedicated control signal is acquired by the terminal according to the pilot signal, the bottom layer control signal and the dedicated multicast data signal transmitted by the control base station;
the synchronization in time and in frequency with the data base station is implemented by the terminal according to the synchronization signal transmitted by the data station; and
the unicast function is implemented by the terminal according to the pilot signal, the bottom layer control signal and the unicast data signal transmitted by the data base station and the high layer dedicated control signal.

12. A method for transmitting a downlink signal, comprising:
receiving, by a terminal, a pilot signal, a bottom layer control signal and a dedicated multicast data signal bearing a high layer dedicated control signal from a control base station;

receiving, by the terminal, a synchronization signal, a pilot signal, a bottom layer control signal and a unicast data signal bearing unicast data information from a data base station; wherein:

the high layer dedicated control signal is acquired by the terminal according to the pilot signal, the bottom layer control signal and the dedicated multicast data signal transmitted by the control base station;

the synchronization in time and in frequency with the data base station is implemented by the terminal according to the synchronization signal transmitted by the data station; and a unicast function is implemented by the terminal according to the pilot signal, the bottom layer control signal and the unicast data signal transmitted by the data base station and the high layer dedicated control signal.

* * * * *